US 11,281,725 B2

(12) United States Patent
Lewin-Eytan et al.

(10) Patent No.: US 11,281,725 B2
(45) Date of Patent: *Mar. 22, 2022

(54) COMPUTERIZED SYSTEM AND METHOD FOR AUTOMATICALLY GENERATING AND PROVIDING INTERACTIVE QUERY SUGGESTIONS WITHIN AN ELECTRONIC MAIL SYSTEM

(71) Applicant: VERIZON MEDIA INC., New York, NY (US)

(72) Inventors: Liane Lewin-Eytan, Haifa (IL); David Carmel, Haifa (IL); Ariel Raviv, Haifa (IL); Alexander Libov, Haifa (IL); Yoelle Maarek, Haifa (IL); Peter Monaco, Los Altos, CA (US)

(73) Assignee: YAHOO ASSETS LLC, Dulles, VA (US)

( * ) Notice: Subject to any disclaimer, the term of this patent is extended or adjusted under 35 U.S.C. 154(b) by 97 days.

This patent is subject to a terminal disclaimer.

(21) Appl. No.: 16/575,806

(22) Filed: Sep. 19, 2019

(65) Prior Publication Data
US 2020/0012686 A1 Jan. 9, 2020

Related U.S. Application Data

(63) Continuation of application No. 15/402,391, filed on Jan. 10, 2017, now Pat. No. 10,459,981.

(51) Int. Cl.
*G06F 16/9032* (2019.01)
*G06Q 10/10* (2012.01)
*G06F 16/332* (2019.01)

(52) U.S. Cl.
CPC .... *G06F 16/90324* (2019.01); *G06F 16/3322* (2019.01); *G06Q 10/107* (2013.01)

(58) Field of Classification Search
CPC .......... G06F 16/90324; G06F 16/3322; G06Q 10/107
See application file for complete search history.

(56) References Cited

U.S. PATENT DOCUMENTS

| 2006/0190435 A1 | 8/2006 | Heidloff et al. |
| 2009/0070321 A1 | 3/2009 | Apartsin et al. |

(Continued)

*Primary Examiner* — Albert M Phillips, III
(74) *Attorney, Agent, or Firm* — James J. DeCarlo; Greenberg Traurig, LLP

(57) ABSTRACT

Disclosed are systems and methods for improving interactions with and between computers in content searching, generating, hosting and/or providing systems supported by or configured with personal computing devices, servers and/or platforms. The systems interact to identify and retrieve data within or across platforms, which can be used to improve the quality of data used in processing interactions between or among processors in such systems. The disclosed systems and methods automatically generate and provide an interactive rich set of personalized query suggestions within a unified framework. The disclosed systems and methods are able to integrate attributes associated with message data and metadata by transforming such attributes into facets that are combined with term suggestions and presented to the user in a unified manner. The instant disclosure provides an interactive search suggestion mechanism that narrows the search as the user interacts with the dynamically generated and provided suggestions.

20 Claims, 11 Drawing Sheets

(56) References Cited

U.S. PATENT DOCUMENTS

| | | |
|---|---|---|
| 2010/0017390 A1 | 1/2010 | Yamasaki et al. |
| 2015/0106358 A1* | 4/2015 | Nachum ............... G06F 16/248 707/722 |
| 2015/0154264 A1* | 6/2015 | Lightner ............. G06F 16/2468 707/780 |
| 2015/0248411 A1 | 9/2015 | Krinker et al. |

* cited by examiner

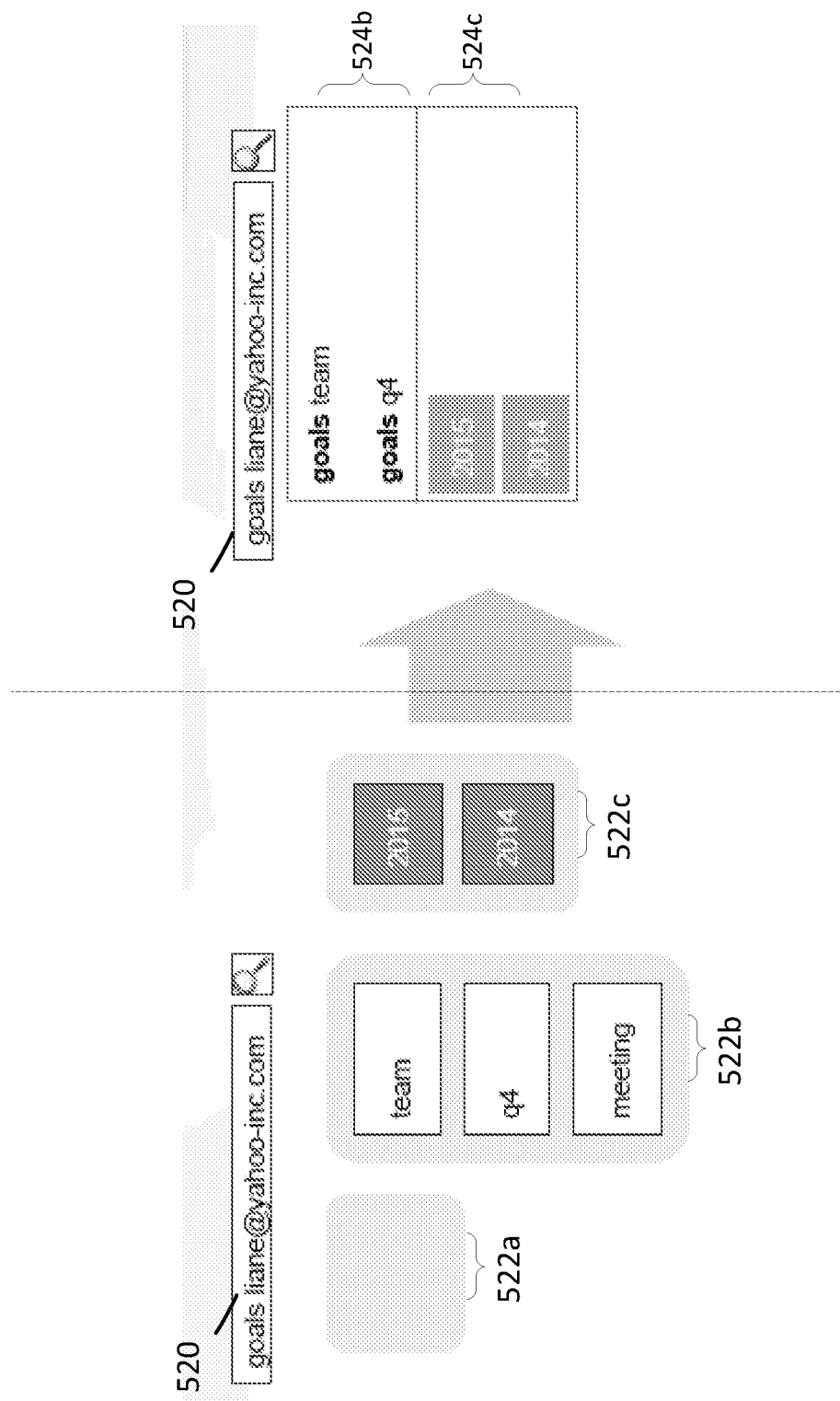

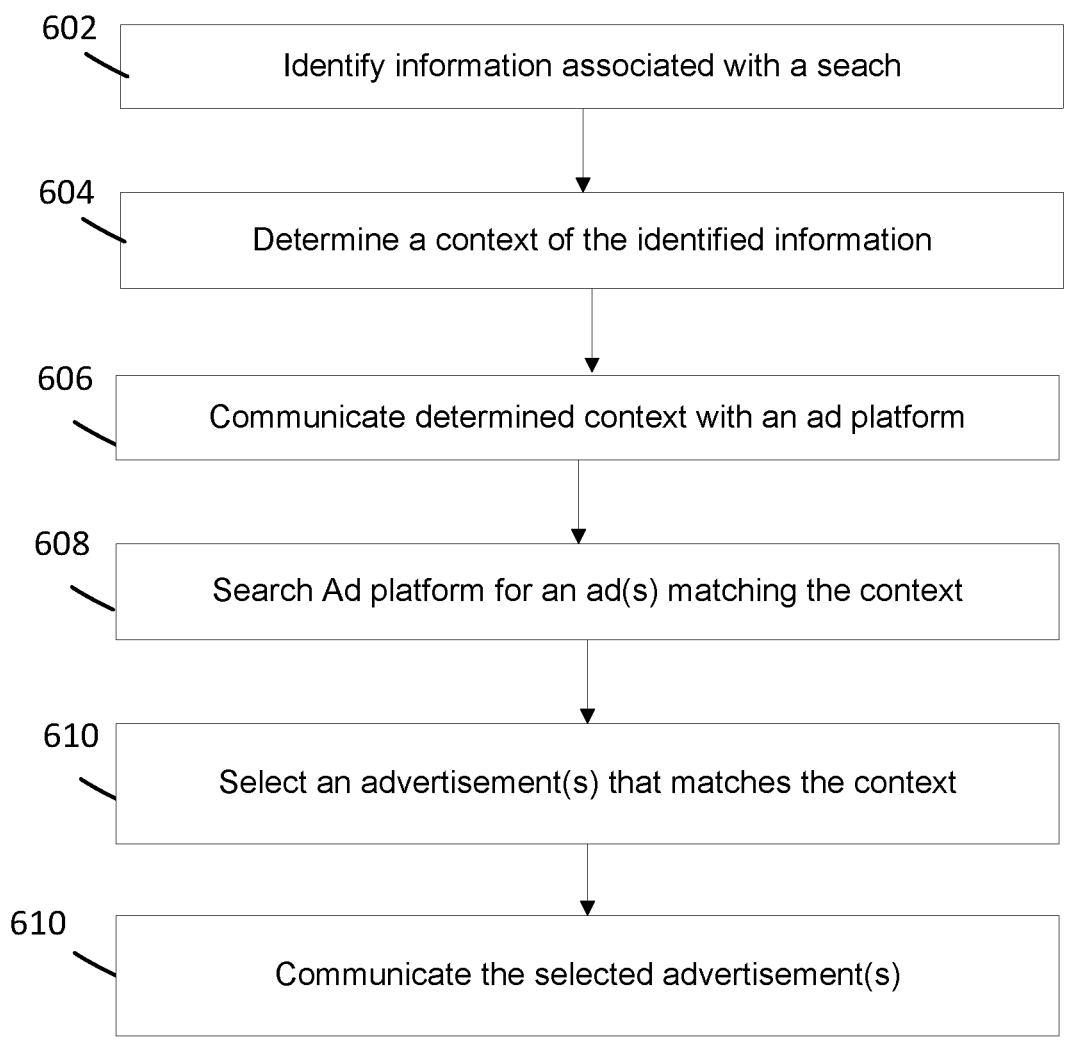

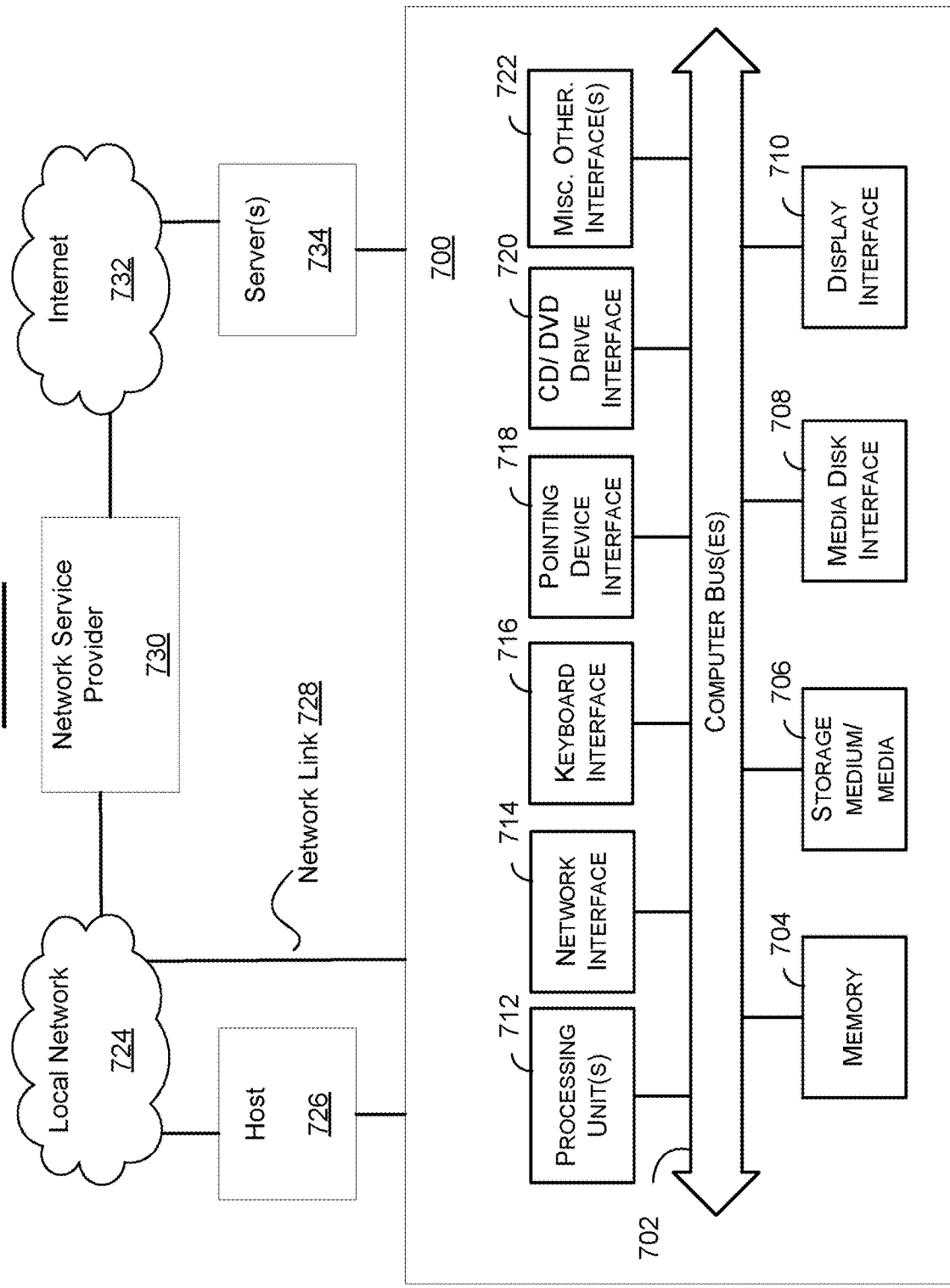

COMPUTERIZED SYSTEM AND METHOD FOR AUTOMATICALLY GENERATING AND PROVIDING INTERACTIVE QUERY SUGGESTIONS WITHIN AN ELECTRONIC MAIL SYSTEM

CROSS REFERENCE TO RELATED APPLICATION

This application is a continuation of, and claims priority from U.S. patent application Ser. No. 15/402,391, filed Jan. 10, 2017, which is incorporated herein by reference.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of content searching, generating, providing and/or hosting computer devices, systems and/or platforms by modifying the capabilities and providing non-native functionality to such devices, systems and/or platforms for a novel and improved framework for automatically generating and providing a set of interactive autocomplete suggestions utilized for automatically searching a collection of messages.

SUMMARY

Conventional searching for items or messages in a user's mailbox has traditionally been driven by the paradigm that involves a user attempting to retrieve a message they remember having seen before. In contrast to web search, most users rarely search their inbox, and if they do, their queries are extremely short (for example, 1.4 terms on the average), and the queries are mostly focused on contact names (e.g., around 40% of queries are for another user's contact information or email address). The limited way user's use mail search today, as well as security and privacy concerns respective to the amount of personal information a user typically keeps in their inbox, poses great difficulty for conventional systems to develop and/or implement rich and effective search assist mechanisms.

The disclosed systems and methods cure failings in known mail systems by providing computerized solutions that provide automated mechanisms for a rich set of interactive and personalized query suggestions to be provided within a unified framework of a user's inbox or mail platform. According to some embodiments, the disclosed systems and methods are able to integrate many or even all possible attributes associated with message data and metadata in a user's inbox, including, but not limited to, time, sender, content of the message body, attachment type, and the like. These attributes are transformed into facets (e.g., classifications or categories of data that provides a representation of a type of attribute) that are presented to the user as suggestions. According to embodiments of the present disclosure, the facets are combined with term suggestions and presented to the user in a unified manner. Thus, the disclosed systems and methods provide an improved interactive search suggestion mechanism that automatically narrows the search of the user as the user interacts with the dynamically generated and provided suggestions, up to the completion of a formulated and performed search of a suggested query.

The disclosed systems and methods provide an improved unified mail-search framework based, at least in part, on the novel implementation of generated facets. As discussed herein, facets are computationally derived from an inbox's messages' attributes, and presented as at least part of query suggestions to a user, thus providing higher quality and more relevant search suggestions. The facets are embedded as suggestions online during query time. Thus, the computerized search systems and methods discussed herein enable the combination of facets with personalized term suggestions derived from the mailbox content and/or a query log of the user's inbox. The usage of personalized faceted suggestions will result in the user being encouraged to select more specific and rich queries, to trust the search system, and to avoid using mail search only as a filter and then tediously browse the messages that have been filtered by contact or keyword alone, as in conventional systems.

Accordingly, in one or more embodiments, a method is disclosed for a novel and improved framework for automatically generating and providing a rich set of personalized query suggestions for a message search. As discussed herein, according to embodiments of the instant disclosure, a search query is entered (which as discussed below can be a prefix of a query, or in some embodiments, an entire query), and based upon analysis of messages that match the search query, attributes of such messages can be identified. These attributes can be leveraged in order to generate a listing of facets that can be ranked based on, among other measures, relevance and frequency of such facet's appearing in messages in the user's inbox. These ranked facets are then displayed to the user, whereby, selection of a facet leads to a narrower search suggestion being used as a search of the user's inbox. Thus, an improved search mechanism is provided that enables more efficient and accurate search suggestions to be presented and utilized as search queries when searching for items within a user's inbox.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for a novel and improved framework for automatically generating and providing a set of interactive autocomplete suggestions utilized for searching a collection of messages.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIGS. 5A-5E illustrate non-limiting embodiments of a message search according to some embodiments of the present disclosure;

FIG. 6 is a flowchart illustrating steps performed in accordance with some embodiments of the present disclosure; and FIG. 7 is a block diagram illustrating the architecture of an exemplary hardware device in accordance with one or more embodiments of the present disclosure.

DESCRIPTION OF EMBODIMENTS

Figure 1:
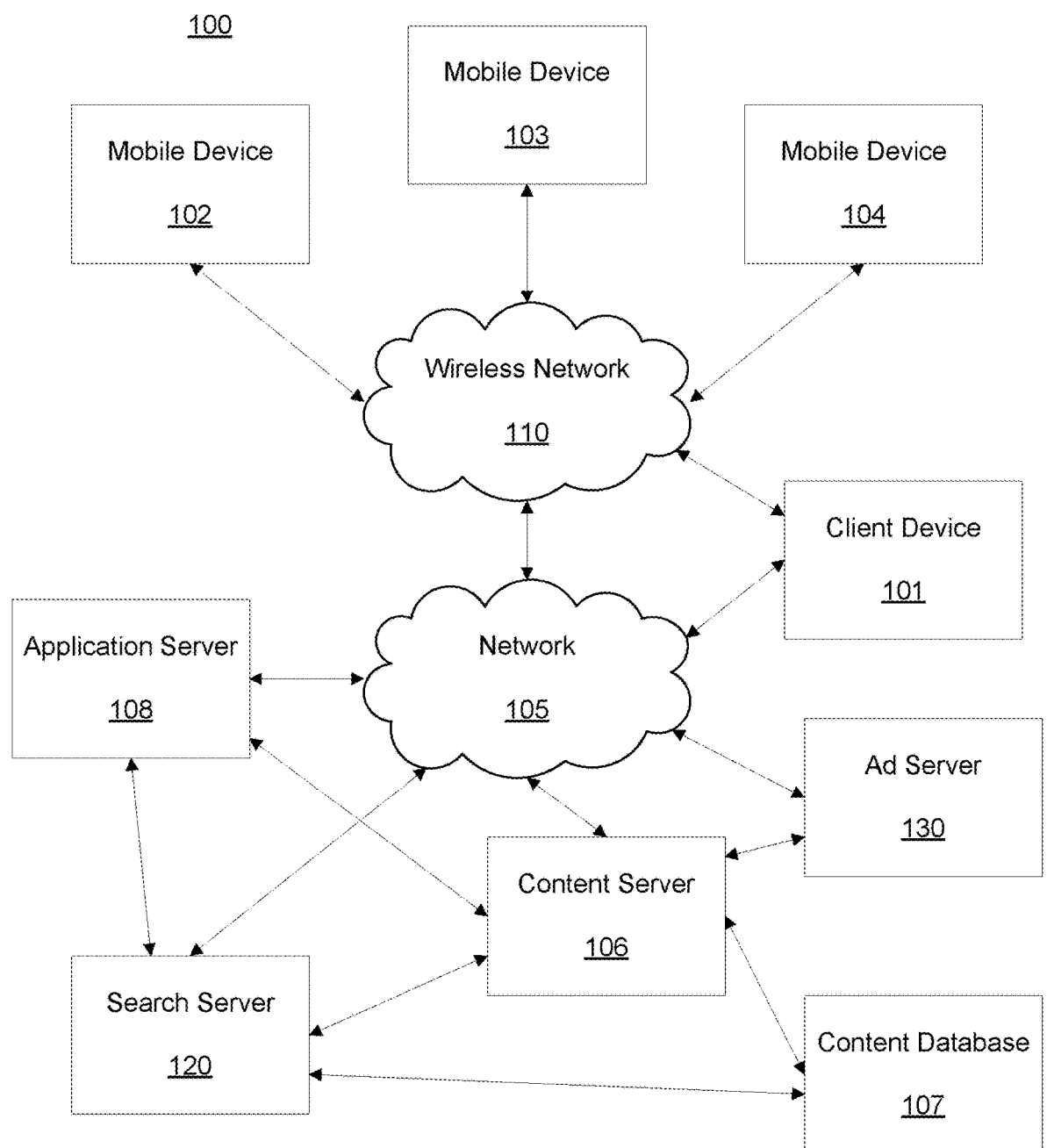
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, 4G or 5G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high-resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo! ® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing, streaming or displaying various forms of content, including locally stored or uploaded images and/or video, or games (such as fantasy sports leagues). The foregoing is provided to illustrate that claimed subject matter is intended to include a wide range of possible features or capabilities.

As discussed herein, reference to an "advertisement" should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/or capabilities. Therefore, while some content is referred to as an advertisement, it is still a digital media item that is renderable by a computing device, and such digital media item comprises content relaying promotional content provided by a network associated party.

The principles described herein may be embodied in many different forms. By way of background, the size of message inboxes (e.g., the number of messages in email inboxes, instant message (IM) inboxes on social media, and the like), as well as the usage and reliance on such mailboxes for users' daily real-world and digital-realm activity continues to grow. Coupled with this, research into user and application habits respective to such mailboxes reveals that most mailboxes are never subject to a "clean-up" or purge of old, or non-relevant messages. As a result, new mechanisms and search capabilities are required, and are even vital for messages to be efficiently and accurately retrieved.

In recent years, there has been hardly any progression in message search mechanisms, which had led to inefficient manners for messages within message inboxes to be identified and leveraged in order to increase user experience. In particular, message (or mail) search assist mechanisms are still rarely used, and even when they are, such conventional mechanisms simply offer a limited set of suggestions compared to their Web counterparts as they focus mainly on a user's contacts and past queries. This is mostly due to the unique characteristics of the message/mail search domain, where most users rarely search their inbox, their queries are extremely short (for example, 1.4 terms on the average), and they are mostly focused on the names of their contacts (e.g., around 40% of the time queries within an inbox are solely focused on a search for a particular contact). This lack of rich and diverse search data of a user, along with security and privacy restrictions that are due to the fully personal nature of mail content, poses great difficulty in today's modern world for enriching the current search assist mechanisms in message inboxes with more diverse and effective search suggestions (also referred to as auto-complete suggestions, interchangeably).

Those users of ordinary skill in the art, and even those moderate users that utilize messaging for even the limited purpose of interactions on the personal level, understand that the conventional mechanisms for performing a search for messages within a message inbox is limited, at best. There is a disconnect between the way users currently use mail search (e.g., searches are rare, they are short and involve general queries). As such, there is a need for a rich query assist mechanism that enables users to formulate longer and more precise queries, which is currently non-existent in the technology field.

As detailed in the discussion herein, and evidenced from the instant disclosure, the suggestion mechanisms provided by implementation of the automated, interactive and novel framework of the disclosed systems and methods constitute an advancement in the technology field of message search through the enrichment of the queries suggested to users when they are performing a message search, thereby reducing the limited, narrow implementations of conventional systems. The instant disclosure provides novel systems and methods that overcome the above mentioned shortcomings in the art, inter alia, by providing a computerized, faceted mail search suggestion mechanism that is adapted to the personalized nature of a particular user, thereby allowing the automatic narrowing of a user's search and resulting in an increased efficiency in the manner a desired message(s) is located.

According to embodiments of the instant disclosure, implementation of the disclosed systems and methods provides advancements in the technological field of mail search through an extended interactive search assist mechanism that is implemented within a user's mailbox (or coupled or integrated with a messaging platform's protocol). The disclosed systems and methods, therefore, provide new mechanisms for mail search assistance that provides the user a set of suggestions in real-time as the user types a query that match the user's search need.

Figure 4:
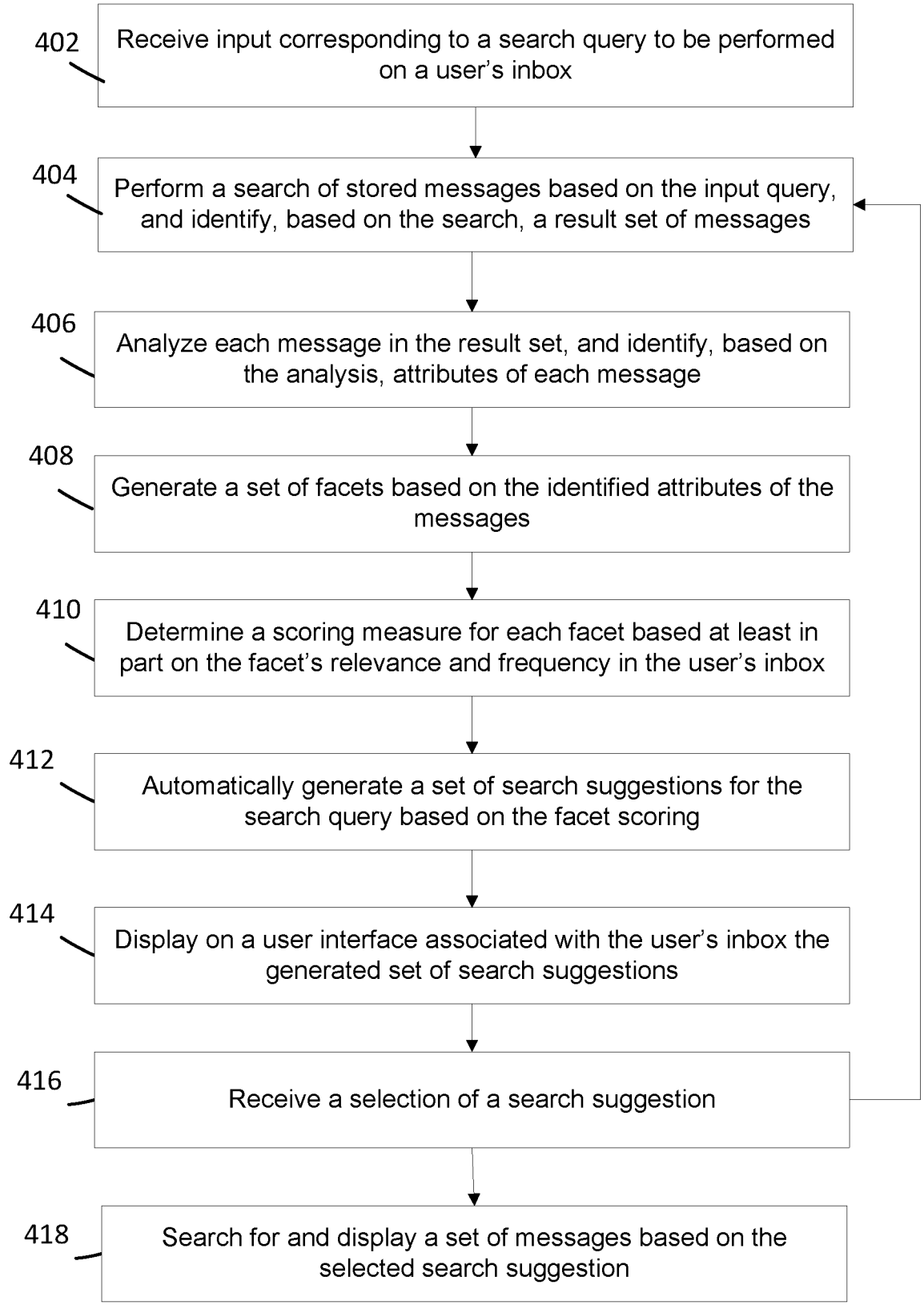
FIG. 4 is a flowchart illustrating steps performed in accordance with some embodiments of the present disclosure.

According to some embodiments, as discussed in more detail below in relation to FIGS. 4-5E, given a search term (e.g., an entered search query which can be a term or a character string of a threshold satisfying length), a first set of messages that match the search term is retrieved (or identified). Then, each message in the initial set of messages is analyzed in order to identify attributes of each message. Such attributes can include data and/or metadata associated with, but not limited to, an identity of a sender or recipient of a message, message content in the message, a time of the message, where it was sent from, where it was received, whether there was an attachment and what type of attachment it is, what rules, if any, the message is subject to (e.g., was it classified in a particular folder), user activity on the message (e.g., was it read, flagged, forwarded, and the like), and the like. Based on these identified attributes, a set of corresponding "facets" are generated.

"Facets," for purposes of this disclosure, correspond to an attribute of message data and/or metadata, and lead to the narrowing of the search space of the user. A facet can be viewed as a categorization or classification of an attribute which can be leveraged in order to group or segment a set of messages according to their common attribute. A facet, therefore, can include a set of items. For example, a generated facet can be a "contact" facet (where the attribute, for example, can be the identity of the sender or recipient, the sender's and/or recipient's email address, and any other type of information that identifies contact information for a message), which includes information about the contact from which a subset of matched messages were received from or sent to—for example, the "contact" facet comprises items corresponding to a set of contacts within the user's contacts. Another example involves a "time" or "date" facet, which includes information regarding a time, or time period corresponding to matched messages. In another non-limiting example, a "folder" facet comprises information regarding the name of the resident folder where a subset of matched messages resides in the user's inbox. In yet another example, an "attachment" facet includes information regarding a type of attachment that can be found in the matched messages (e.g., a photograph, document, video, another message, and the like). And, another non-limiting example of a facet can be an "action" (or "user action") facet which includes information indicating what type of user activity the user performed on the message. As evidenced from the example facets and the description of the attributes above, facets are generated based upon the attribute data and/or metadata.

For a given set of generated facets, term suggestions are then generated for each facet. In some embodiments, term suggestions are determined by analyzing the message content of the messages associated with a particular facet in order to identify the terms that match, at least to a threshold value, the entered search term. In some embodiments, terms suggestions can be determined alternatively or additionally by searching a query log of the user to identify previously entered queries that match the entered search term. These generated term suggestions are then combined with (or linked or associated with) the facet information, ranked according to measures of relevance, frequency, freshness, whether they were used in previous queries, and the like, and displayed to the user within a user interface of the user's inbox.

By way of a non-limiting example, user Bob enters a search query of "hal". Since, in this example, the threshold for performing the disclosed search suggestions mechanisms is set at three (3) characters, upon Bob typing in the letter "1", the search suggestion process discussed herein begins. After an initial set of messages that comprise the character string "hal" is identified, which can be within the message body, in the recipients or sender information, in an attachment, or anywhere else in the data or metadata of a message, such messages are analyzed to identify their attributes. These attributes are then leveraged into generated facets.

For example, two facets can be generated: one for the term "Halloween" because Bob sent his two children emails on Halloween (which corresponds to a content facet); and another for the six messages associated with his wife "Hallie," as four emails were identified in the initial search as being from his wife, and two more were sent to her (which corresponds to a contact facet).

In some embodiments, a selection between the two facets ("Halloween" and "Hallie" is made, as discussed in more detail below), and as a result of such selection, term suggestions are then generated by analyzing the content of the messages associated with the selected facet. In some embodiments, the analysis can be performed on any and/or all messages in Bob's inbox. These suggestions are then respectively combined with the selected facet. As discussed in more detail below, this combination involves ranking and ordering the suggestions for each facet according to measures relevance, frequency, freshness, and the like. Using freshness as an example, the terms derived from the messages that were most recently sent/received are ranked higher than those terms identified from the older messages.

Next, the combined facet and term suggestions are provided for display to the user. In some embodiments, when the server is performing such actions, the user's device is caused to display such data. In some embodiments, the user device can receive instructions causing it to perform such display.

Figure 5A:
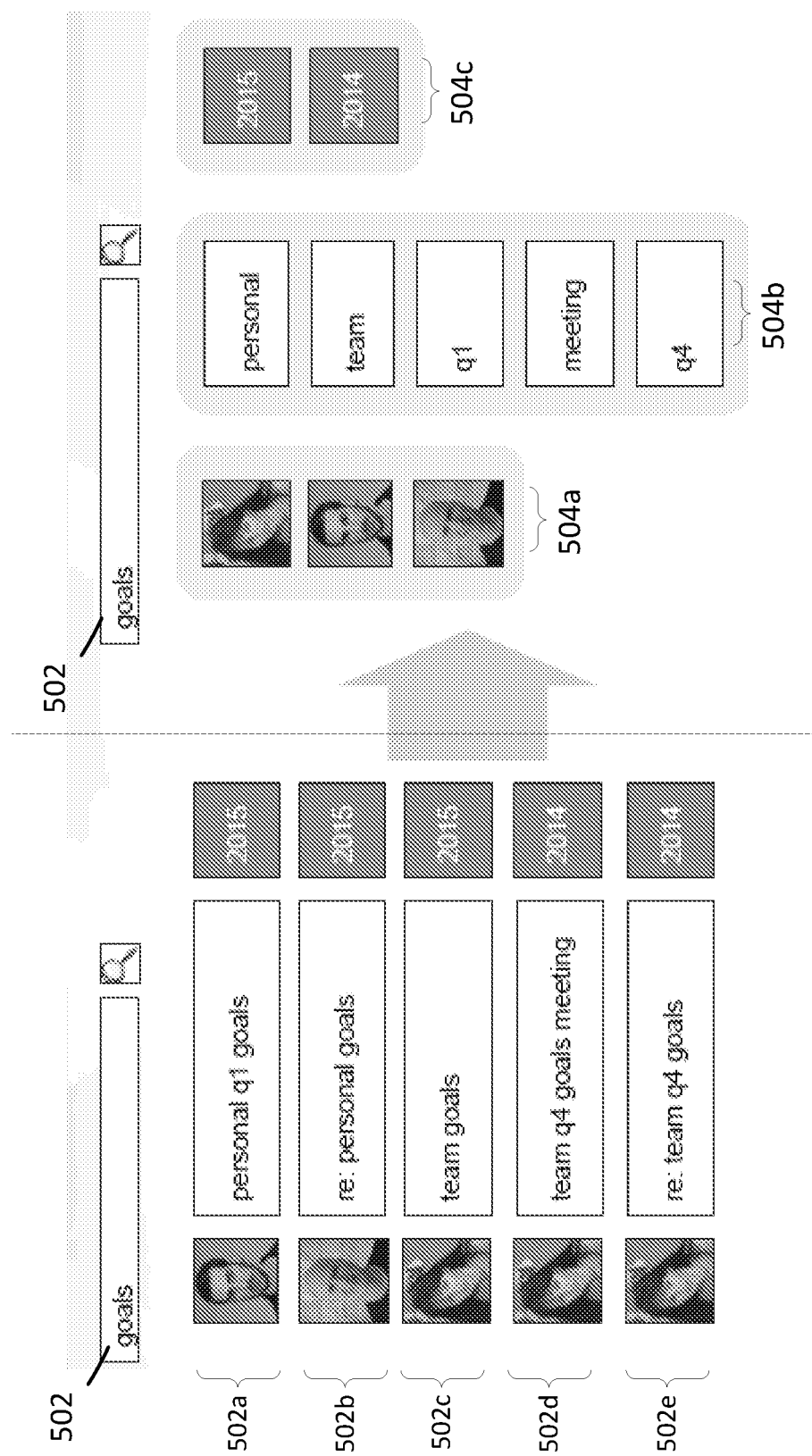
Figure 5B:
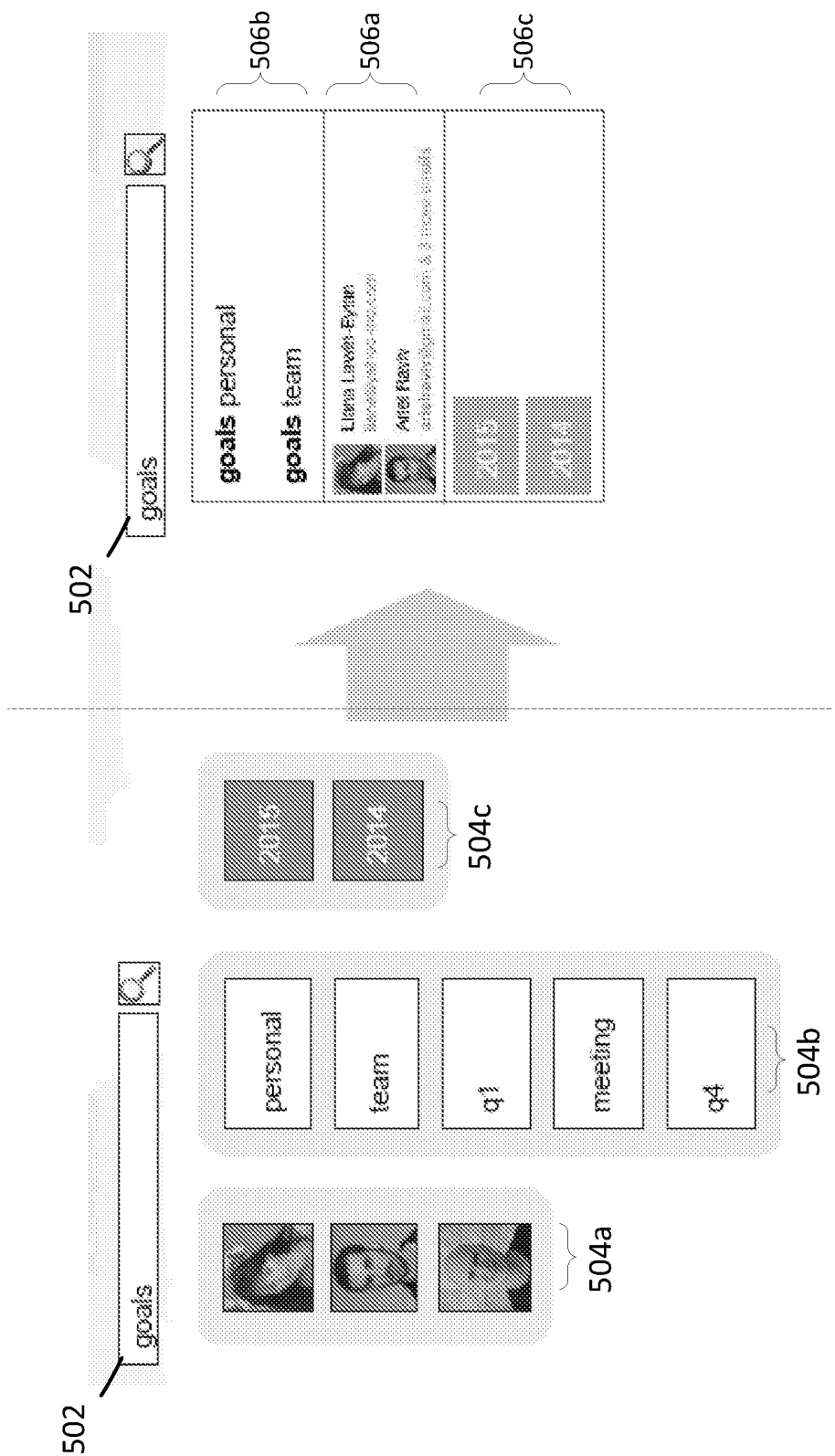
Figure 5C:
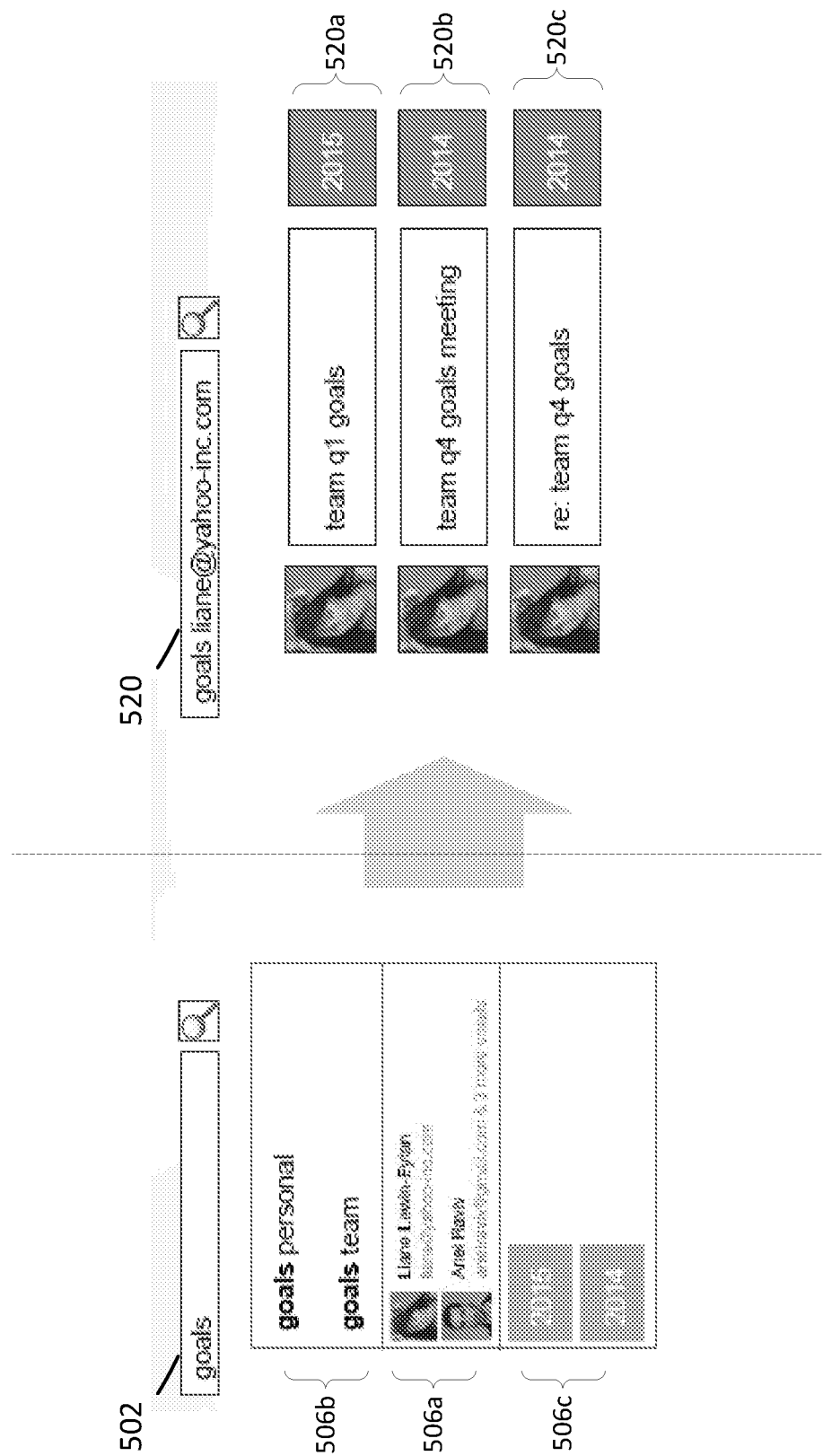

As an example of the how the facets are displayed to Bob, FIG. 5C illustrates an example of a search term "goals" being used to identify three facets of suggestion information: terms, contacts and time (items, 506b, 506a and 506c, respectively). The user can select these facets as auto-complete suggestions. For example, if the user, as in FIG. 5C selects the contact for "Liane" (within item 506a), the search will now be for "goals" and Liane's contact information (as illustrated in search box 520 in FIG. 5C). According to some embodiments, as discussed in detail below, after a facet is generated (and displayed), and a term(s) within the facet is selected, the search can be narrowed based on that selected facet-term such that additional facets can be generated and displayed, where the terms and/or facets include or have associated therewith content that is subject to the selected facet-term. The discussion of the examples of FIGS. 5A-5C will be discussed in more detail below in relation to FIG. 4, as they were put forth here to provide an example of how Bob's example search suggestion can be displayed, provided and interacted with by Bob.

According to embodiments of the instant disclosure, the analysis of the messages, identification of the attributes, and generation and ranking of the facets which leads to the auto-complete suggestions are all performed automatically by the query suggestion engine 300, discussed in more detail in relation to FIGS. 3-5E. The automation of these steps, among others, occurs in real-time, or near-real-time, such that as the user enters a query (e.g., when the user enters characters into a search box or when the user provides input to perform a search), these steps are being performed in the background thereby enabling a real-time, personalized reflection of suggestions that are based on, and serve as, extensions of the currently entered query.

It should be understood that while the discussion herein focuses on entered characters (e.g., letters, numbers, symbols and/or any other type of character that can be entered or understood by a keyboard or voice recognition program of a device), it should not be construed as limiting, as any type of input can serve as the search query. For example, a search query can involve, or be based upon, detected audio, captured images or video, determination of a location, detection of a specific time, detection of an identify of a user logging into an account or using a device, and the like, or some combination thereof.

As discussed in more detail below at least in relation to FIG. 6, according to some embodiments, information associated with, derived from, or otherwise identified from, during or as a result of a search for a message (e.g., mail item), as discussed herein, can be used for monetization purposes and targeted advertising when providing, delivering or enabling such devices access to messages, media and/or applications provided over a network. Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, search server 120 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as, but not limited to, acquaintances, friends, family, colleagues, or co-workers, that are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site, service or an associated application, such as, an email platform (e.g., Yahoo! ® Mail), a social networking site, a photo sharing site/service (e.g., Tumblr®), a search platform or site, or a personal user site (such as a blog, vlog, online dating site, and the like) and the like. A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a mail application and/or email-platform, can be provided via the application server 108, whereby a user is able to utilize such service upon the user being authenticated, verified or identified by the service. Examples of content may include videos, text, audio, images, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a mail or messaging application (e.g., Yahoo! ® Mail, Yahoo! ® Messenger), a photo sharing/user-generated content (UGC) application (e.g., Flickr®, Tumblr®, and the like), a streaming video application (e.g., Netflix®, Hulu®, iTunes®, Amazon Prime®, HBO Go®, and the like), blog, photo or social networking application (e.g., Facebook®, Twitter® and the like), search application (e.g., Yahoo! ® Search), and the like, can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
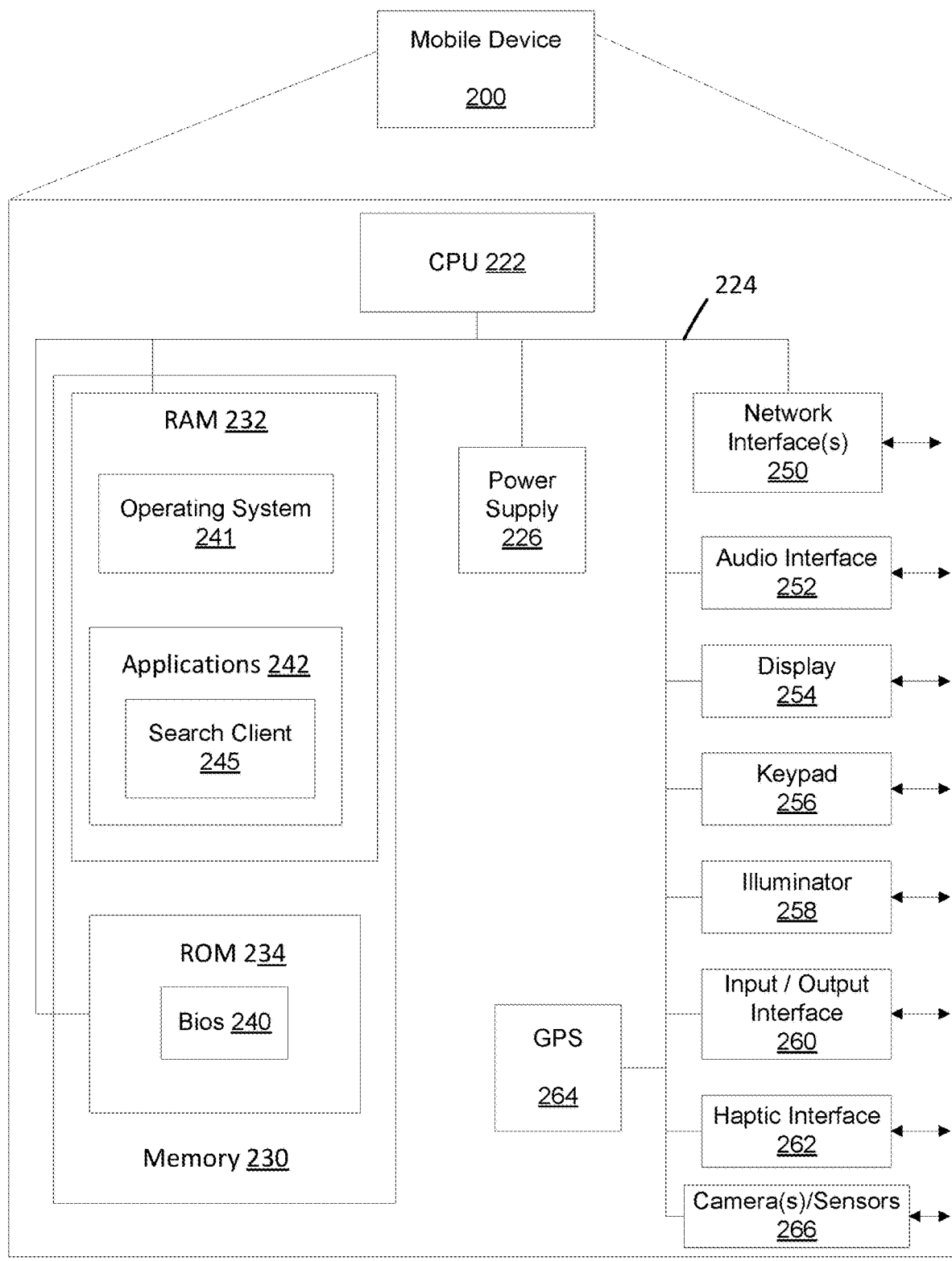
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving digital content (e.g., advertisements) or other forms of digital data associated with, but not limited to, IMs, emails, and other types of known messages, or the like.

Having described the components of the general architecture employed within the disclosed systems and methods, the components' general operation with respect to the disclosed systems and methods will now be described below with reference to FIGS. 3-5E.

Figure 3:
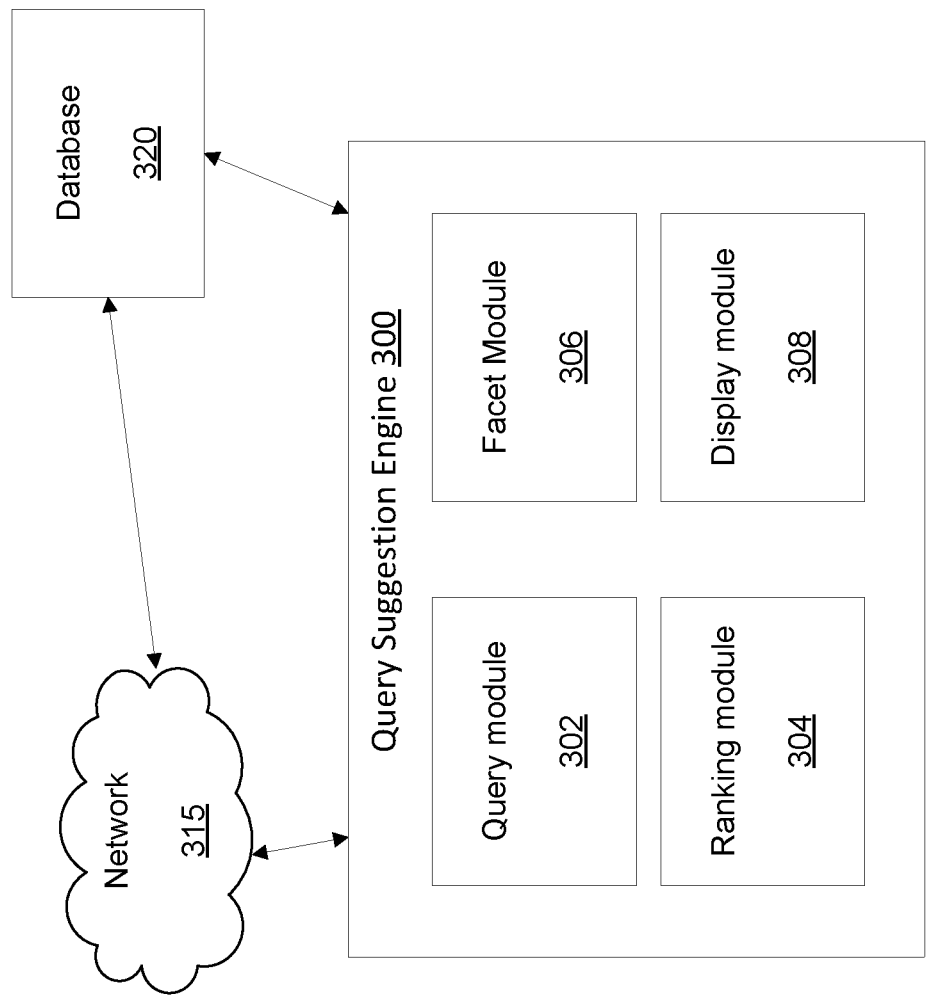
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes a query suggestion engine 300, network 315 and database 320. The query suggestion engine 300 can be a special purpose machine or processor and could be hosted by a messaging server, application server, content server, social networking server, web server, search server, content provider, email service provider, ad server, user's computing device, and the like, or any combination thereof.

According to some embodiments, query suggestion engine 300 can be embodied as a stand-alone application that executes on a user device. In some embodiments, the query suggestion engine 300 can function as an application installed on the user's device, and in some embodiments, such application can be a web-based application accessed by the user device over a network. In some embodiments, the query suggestion engine 300 can be installed as an augmenting script, program or application to another messaging and/or media content hosting/serving application, such as, for example, Yahoo!® Mail, Yahoo!® Messenger, Yahoo!® Search, Flickr®, Tumblr®, Twitter®, Instagram®, SnapChat®, Facebook®, and the like.

The database 320 can be any type of database or memory, and can be associated with a content server on a network (e.g., content server 106, search server 120, ad server 130 or application server 108 from FIG. 1) or a user's device (e.g., device 101-104 or device 200 from FIGS. 1-2). Database 320 can comprise, for example, a dataset of content items, device data and associated metadata, and user data and associated user metadata. Such information can be stored in the database 320 independently and/or as a linked or associated dataset. It should be understood that the data (and metadata) in the database 320 can be associated with any type of content, user, device or network information and type, whether known or to be known, without departing from the scope of the present disclosure.

Database 320 comprises a dataset of data and metadata associated with content items. For purposes of the present disclosure, reference to content items will be made with regard to electronic messages (comprising digital content) as a whole; however, it should not be construed to limit the applications of the systems and methods discussed herein. While reference is made throughout the instant disclosure to electronic messages, other forms of electronic documents or transmissions (e.g., Short Message Service (SMS) messages, Multi-media Message Service (MMS) messages, and the like) can be communicated and/or accessed and processed by the query suggestion engine 300 according to the systems and methods discussed herein. For example, searching for and/or identifying content items, as per the steps outlined in Process 400, as discussed in detail below, can include identifying any type of known or to be known form of digital content, whether as a whole file or included within a file, including, messages, text, audio, video, short form videos, multi-media, and the like.

The messages and the data and metadata of such messages processed according to the disclosed systems and methods, and stored in database 320, can be any type of message. Examples of such messages can include, but are not limited to, email messages, HTML forms SMS/MMS messages, Skype® messages, Twitter® messages and other social messages, comments to an article or website, online forum posts/entries, word processing documents, help desk messages, portable document format (PDF) documents and/or other types of documents. The messages can be provided to the query suggestion engine 300 or accessed by a computer program or device that can access the messages. In some embodiments, the messages can be stored in a database of stored messages 320, which is associated with an email provider, such as Yahoo! Mail®.

Database 320 can also comprise a dataset of data and metadata associated with local and/or network information related to users, devices, services, applications, user-generated content, third party provided content, and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, i.e., user data. According to some embodiments, the stored user data can include, but is not limited to, information associated with a user's profile, user interests, user behavioral information, user attributes, user preferences or settings, user demographic information, user location information, user biographic information, and the like, or some combination thereof.

According to some embodiments, the user data can also include, for purposes searching, receiving and/or displaying messages, rendering and/or displaying content, and/or downloading, streaming and/or accessing applications on or over the network, device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can comprise information associated with content providers, such as, but not limited to, content generating and hosting sites or providers that enable users to search for, send and/or receive, upload, download, share, edit or otherwise avail users to content (e.g., Yahoo! ® Search, Yahoo! ® Mobile applications, Yahoo!® Mail, Flickr®, Tumblr®, Twitter®, Instagram®, SnapChat®, Facebook®, and the like). In some embodiments, database 320 can comprise data and metadata associated with such content information from one and/or an assortment of media hosting sites. In some embodiments, such content provider information can include, but is not limited to, versions, types and/or capabilities of applications that are resident or accessed by a user device, and/or are capable of being downloaded, executed, accessed or run on user device for purposes of rendering content.

In some embodiments, the information stored in database 320 can be represented as an n-dimensional vector (or feature vector) for each stored data/metadata item, where the information associated with, for example, the stored data and/or metadata can correspond to a node(s) on the vector. As such, database 320 can store and index stored information in database 320 as linked set of data and metadata, where the data and metadata relationship can be stored as the n-dimensional vector discussed above. Such storage can be realized through any known or to be known vector or array storage, including but not limited to, a hash tree, queue, stack, VList, or any other type of known or to be known dynamic memory allocation technique or technology. While the discussion of some embodiments involves vector analysis of stored information, as discussed above, the information can be analyzed, stored and indexed according to any known or to be known computational analysis technique or algorithm, such as, but not limited to, word2vec analysis, cluster analysis, data mining, Bayesian network analysis, Hidden Markov models, artificial neural network analysis, logical model and/or tree analysis, and the like.

In some embodiments, database 320 can be a single database housing information associated with one or more devices, users, services and/or content providers, and in some embodiments, database 320 can be configured as a linked set of data stores that provides such information, as each datastore in the set is associated with and/or unique to a specific user, device, service and/or content provider.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the query suggestion engine 300, and the database of stored resources 320. Indeed, as illustrated in FIG. 3, the query suggestion engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as query suggestion engine 300, and includes query module 302, ranking module 304, facet module 306 and display module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Turning to FIG. 4, Process 400 details steps performed in accordance with some embodiments of the present disclosure for generating and providing a rich set of personalized query suggestions within a unified framework. The disclosed systems and methods are able to integrate attributes associated with message data and metadata by transforming such attributes into facets that are then combined with term suggestions and presented to the user in a unified manner. The instant disclosure provides an interactive and personalized search suggestion mechanism that narrows the search as the user interacts with the dynamically generated and provided suggestions.

Steps 402-404 and 418 of Process 400 are performed by the query module 302 of the query suggestion engine 300; Steps 406-408 and 412 are performed by the facet module 306; Step 410 is performed by the ranking module 304; and Steps 414-416 are performed by the display module 308.

Process 400 begins with Step 402 where input corresponding to a search query to be performed is received or detected. An example of such input is illustrated by the entered search term "goals" in search box 502, as illustrated in FIG. 5A. As discussed above, such input can be a search term, or a string of characters satisfying a threshold length value. Therefore, as the user enters characters in a search box of an inbox, a real-time determination is performed that monitors how many characters are being entered, and upon the threshold length value being satisfied, Step 404 is automatically triggered. In some embodiments, Step 404 and the subsequent steps can also, or alternatively be triggered upon input being received in Step 402 that a search term has been completely entered (e.g., the enter key being selected on a keyboard or the "search button" on a search box being selected).

In some embodiments, the search query in Step 402 can be for a search of the entire collection of messages in a user's inbox, and in some embodiments, the query can be for a subset of messages within the inbox (for example, within a specified folder).

In Step 404, based on the input search term, a search of stored messages in a user's inbox is performed, and based on the search, a set of messages is identified (and/or retrieved) that includes the search term. For example, as in the example of FIG. 5A, the term "goals" is used to search the stored (e.g., previously received) messages of the user and identify messages that comprise data and/or metadata including, or associated with the character string "goals."

In Step 406, each message in the result set of Step 404 is analyzed, and based on such analysis, attributes of each message are identified. As discussed above, such attributes can include data and/or metadata associated with, but not limited to, an identity of a sender or recipient of a message, message content in the message, a time of the message, where it was sent from, where it was received, whether there was an attachment and what type of attachment it is, what rules, if any, the message is subject to (e.g., was it classified in a particular folder), user activity on the message (e.g., was it read, flagged, forwarded, and the like), and the like.

According to some embodiments, such analysis can involve parsing the data and/or metadata of the messages and analyzing such parsed data/metadata via any known or to be known algorithm, technique, mechanism or technology that performs computational analysis of message data/metadata in order to identify the information such data represents. For example, such computational analysis algorithms, techniques, mechanisms and/or technology can include, but are not limited to, classifiers and/or categorizers using logistic regression or learning models including, for example, support vector machines (SVMs) to map the information in the data into identifiable data objects.

In Step 408, having identified the attributes of the messages identified in Step 404 (e.g., the initial message set), the attributes are leveraged in order to generate a set of facets for the identified messages. As discussed above, facets correspond to an attribute of message data and/or metadata, which serve as a determined category or class of attribute type. Thus, Step 408 can involve analyzing each attribute identified in Step 406 and determining a type of each facet, then creating a data item, data structure or new data value that represents a type of attribute(s). The attribute data/metadata for each facet—the created facet data—is combined with a determined term suggestion in order to generate the information that is included (and ultimately displayed, as discussed below) for each facet.

As discussed above and in more detail below, each generated facet is represented by a set of respective terms, and subject to a facet selection, or selection of a term within a facet (a facet-term), the search is narrowed based on the selected facet/facet-term, and as a result, new facet-terms are suggested accordingly. In some embodiments, facet-terms can be suggested, or included within a displayed facet as a result of a query log search, such that previously entered queries that match the entered search term are utilized to populate the facet.

For example, as illustrated in FIG. 5A, items 502a-502e represent messages that included data and/or metadata associated with the term "goals." Using the term suggestion determination process discussed above, which involves searching these messages, in some embodiments, for corresponding data associated with the search term, term suggestion information can be identified and included as information for a message. For example, item 502a represents that an identified message includes attribute information associated with the term "goal," and via the term suggestion identification process (e.g., via a search of messages and/or a search of a user's query log), term suggestions can be compiled, which include: a contact (as illustrated by the example depiction of a contact's picture or profile picture), terms of a message (as illustrated by the example listing of the terms "personal q1 goals" which was identified in a message), and the time (as illustrated by the example year "2015"). Likewise for items 502b-502e, each illustrates information for those messages which can be leveraged into facets. FIG. 5A then depicts that the information in items 502a-502e is leveraged to generate facets 504a-504c: "contact"—item 504a; "terms"—item 504b; and "time"—item 504c.

In Step 410, the information in each facet is ranked and ordered (or organized) according to a determined scoring measure for each item of information falling under the classification of the respective facet. For example, as illustrated in FIG. 5A, the time information within the "time" facet, item 504c, is scored such that the year "2015" is ranked higher than the year "2014." In another example, the scoring of the terms from items 502a-502e leads to the termination that the terms falling under the "term" facet, item 504b, are ordered such that the term "personal" is the highest ranking term of relevance to the entered term "goals." Such scoring and ranking is performed in a similar manner for the contact facet items 504a.

As discussed above, such scoring and ranking of the items within a facet are based on scoring measures respective to the user's inbox that are determined in accordance with measures of relevance, frequency, freshness, and the like. For example, for a "contact" facet, items correspond to different, specific contacts. Therefore, all of the messages (or in some embodiments, a subset of all the messages) in the user's inbox that were sent to and/or received from each specific contact in the facet are analyzed in order to compute a score according to their amount (or volume or quantity), frequency, relevance to the search term (or "likelihood" in reference to whether and/or how many of those messages from a contact were included in the messages identified in Step 404), freshness (e.g., which was the latest message sent/received), information gain (e.g., how often the item in the facet appears in messages included and/or not included in the retrieved messages of Step 404) and the like, or some combination thereof.

In Step 412, the items in each facet are ranked according to their scores, and a set search suggestions are automatically generated as a result. For example, as illustrated in FIG. 5B, the items in facets 504a-504c are ranked according to those items in each facet having the higher score being ranked above those with a lower score, and as a result, the information associated with and comprised within each facet can be provided for display to the user in association with the search box used to enter the query. In some embodiments, the aggregate scoring of items in one facet can be compared to another facet's aggregate scoring such that the term suggestions of a facet can be displayed above those of another facet. For example, as illustrated in FIG. 5B, the items determined from facet 504b are displayed above those of facet 504a by the depiction of corresponding suggestions of facet 504b being the first displayed suggestion—item 506b (which corresponds to facet 504b) is displayed above item 506a (which corresponds to facet 504a).

In Step 414, the suggestions are displayed in an area of the inbox user interface, or as an overlaying embedded or associated user interface, that is correlated to the search box so that the user is aware the suggestions are associated with the entered query in search box. For example, as illustrated in FIG. 5B, the items of suggestions 506b, 506a and 506c, which comprise information providing suggestions for corresponding facets, as discussed above, are displayed in connection with the search box 502.

In some embodiments, the number of suggestions provided to the user in Step 414 can be limited so that only a predetermined number of suggestions are provided to the user. Such predetermined number of suggestions can be based on a variety of factors that are taken into consideration by the display module 308 of engine 300 when determining how many suggestions to display overall, or per facet. Such factors can include, but are not limited to, how many terms' scores satisfy a threshold, how many messages where identified in the initial search of messages in Step 404, the screen space of the device the user is using when performing the search, whether the device the user is using is a mobile device or desktop version, whether the user is using a mobile application or a desktop version of the messaging program/platform, and the like, or some combination thereof.

In Step 416, a selection of a search suggestion is received. In some embodiments, the selection can be based upon user input responsive to one of the suggestions being displayed.

In some embodiments, after the user selects a suggestion, Process 400 reverts back to Step 404, where another set of messages (e.g., a subset of messages) is identified based on the selected suggestion now being appended to the initially entered search term. For example, as illustrated in FIG. 5C, the user selects the contact information for contact "Liane" (e.g., her email address from item 506*a*), which is now appended to the term "goals" in search box 520. Thus, the search mechanism repeats itself according to the same manner as discussed above with respect to Steps 404-414. This is illustrated in FIGS. 5D-5E.

Figure 5D:
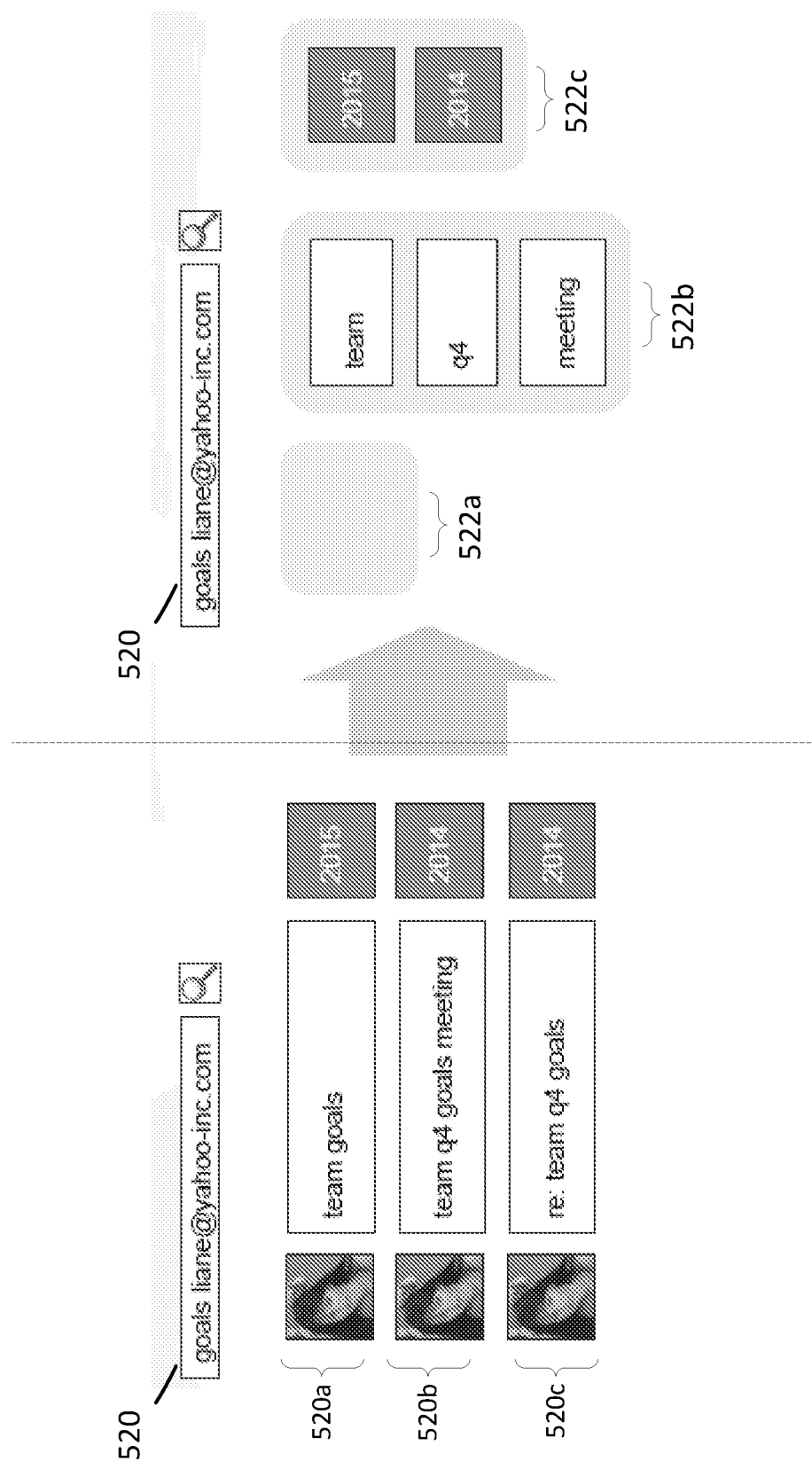

In FIG. 5D, an initial set of messages from the search terms in search box 520 is performed and the information for such messages and term suggestions determined in accordance with the message information and/or a query log, as illustrated by items 520*a*-520*c*, is leveraged into facets (e.g., items 522*a*-522*b*), as discussed above in relation to Steps 404-410. In some embodiments, since the contact facet is the one selected for the narrowed search (when repeating the process), facet item for the contact facet 522*a* would be empty—for illustrative purposes item 522*a* is depicted; however, it should not be construed as limiting the instant disclosure to having an empty facet being displayed, as in some embodiments, facet item 522*a* would not be displayed. The items in each facet are then ranked in a similar manner as discussed above in relation to Step 412, and suggestions for each facet are displayed according to such ranking. For example, as illustrated in FIG. 5E, the suggestions for the "terms" facet 522*b* are ranked above the "time" facet 522*c*, and displayed as items 524*b* and 522*c*, respectively.

In some embodiments, a user could then select another suggestion and further narrow the search such that the matched messages are narrowed down even further (e.g., repeat steps 404-414 again). In some embodiments, in Step 418, a set of messages can be displayed based upon the current search term(s).

FIG. 6 is a work flow example 600 for serving relevant digital media content associated with or comprising advertisements (e.g., digital advertisement content) based on the information associated with a mail search, as discussed above in relation to FIGS. 3-5E. Such information, referred to as "search information" for reference purposes only, can include, but is not limited to, information associated with an entered search query, attributes, facets and/or term suggestions associated with a search query, an identity or other related information corresponding to a user entering a search, content of identified mail messages, and the like, and/or some combination thereof.

As discussed above, reference to an "advertisement" should be understood to include, but not be limited to, digital media content that provides information provided by another user, service, third party, entity, and the like. Such digital ad content can include any type of known or to be known media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities. Therefore, while the content is referred to as an advertisement, it is still a digital media item that is renderable by a computing device, and such digital media item comprises digital content relaying promotional content provided by a network associated third party.

In Step 602, search information is identified. As discussed above, the search information can be based any of the information from processes outlined above with respect to FIGS. 3-5E. For purposes of this disclosure, Process 600 will refer to single mail search as the basis for serving a digital advertisement(s); however, it should not be construed as limiting, as any number of searches and/or identified mail items, as well as programs used and/or content items included therein during such search can form such basis, without departing from the scope of the instant disclosure.

In Step 604, a context is determined based on the identified search information. This context forms a basis for serving advertisements related to the search information. In some embodiments, the context can be determined by determining a type of content identified within an identified mail (or message) item. In some embodiments, the context can be based on a determined category which the search information of Step 602 represents. For example, a search can be based on a query for mail items that include the category of content corresponding to "hunting;" therefore, the context identified in Step 604 can be related to "hunting" or other "in-season outdoors activities" and can be leveraged in order to identify digital ad content of interest to the searching user, as discussed herein in relation to the steps of Process 600. In some embodiments, the identification of the context from Step 604 can occur before, during and/or after the analysis detailed above with respect to Process 400, or some combination thereof.

In Step 606, the determined context is communicated (or shared) with an advertisement platform comprising an advertisement server 130 and ad database. Upon receipt of the context, the advertisement server 130 performs (e.g., is caused to perform as per instructions received from the device executing the query suggestion engine 300) a search for a relevant advertisement within the associated ad database. The search for an advertisement is based at least on the identified context.

In Step 608, the advertisement server 130 searches the ad database for a digital advertisement(s) that matches the identified context. In Step 610, an advertisement is selected (or retrieved) based on the results of Step 608. In some embodiments, the selected advertisement can be modified to conform to attributes or capabilities of the page, interface, message, platform, application or method upon which the advertisement will be displayed, and/or to the application and/or device for which it will be displayed. In some embodiments, the selected advertisement is shared or communicated via the application the user is utilizing to view, search for and/or render messages or media. Step 612. In some embodiments, the selected advertisement is sent directly to each user's computing device. In some embodiments, the selected advertisement is displayed within a portion of the interface or within an overlaying or pop-up interface associated with the messaging interface used to search for messages.

As shown in FIG. 7, internal architecture 700 of a computing device(s), computing system, computing platform and the like includes one or more processing units, processors, or processing cores, (also referred to herein as CPUs) 712, which interface with at least one computer bus 702. Also interfacing with computer bus 702 are computer-readable medium, or media, 706, network interface 714, memory 704, e.g., random access memory (RAM), run-time transient memory, read only memory (ROM), media disk interface 708 and/or media disk drive interface 720 as an interface for a drive that can read and/or write to media including removable media such as floppy, CD-ROM, DVD, media, display interface 710 as interface for a monitor or other display device, keyboard interface 716 as interface for a keyboard, pointing device interface 718 as an interface for a mouse or other pointing device, and miscellaneous other interfaces 722 not shown individually, such as parallel and serial port interfaces and a universal serial bus (USB) interface.

Memory 704 interfaces with computer bus 702 so as to provide information stored in memory 704 to CPU 712 during execution of software programs such as an operating system, application programs, device drivers, and software modules that comprise program code, and/or computer executable process steps, incorporating functionality described herein, e.g., one or more of process flows described herein. CPU 712 first loads computer executable process steps from storage, e.g., memory 704, computer readable storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage, e.g., medium/media 706, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 728 typically provides information communication using transmission media through one or more networks to other devices that use or process the information. For example, network link 728 may provide a connection through local network 724 to a host computer 726 or to equipment operated by a Network or Internet Service Provider (ISP) 730. ISP equipment in turn provides data communication services through the public, worldwide packet-switching communication network of networks now commonly referred to as the Internet 732.

A computer called a server host 734 connected to the Internet 732 hosts a process that provides a service in response to information received over the Internet 732. For example, server host 734 hosts a process that provides information representing image and/or video data for presentation at display 710. It is contemplated that the components of system 700 can be deployed in various configurations within other computer systems, e.g., host and server.

At least some embodiments of the present disclosure are related to the use of computer system 700 for implementing some or all of the techniques described herein. According to one embodiment, those techniques are performed by computer system 700 in response to processing unit 712 executing one or more sequences of one or more processor instructions contained in memory 704. Such instructions, also called computer instructions, software and program code, may be read into memory 704 from another computer-readable medium 706 such as storage device or network link. Execution of the sequences of instructions contained in memory 704 causes processing unit 712 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 700. Computer system 700 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 702 as it is received, or may be stored in memory 704 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
    receiving, at a computing device, a search query for a search of an inbox of a user, said search query comprising a character string;
    searching, via the computing device, a collection of messages within the inbox based on the search query and identifying a first set of messages comprising information that includes said character string;
    parsing, via the computing device, the first set of messages and, based on said parsing, identifying attributes of each message and a type of each attribute;
    generating, via the computing device, a set of facets based on the identified attributes, each generated facet comprising a data item that represents at least one of a type of attribute;
    analyzing, via the computing device, information associated with messages in the inbox based on the search query and said set of facets, and based on said analysis, determining a set of terms that are associated with each facet in the set of facets;
    determining, via the computing device, a set of search suggestions based on the set of terms and the set of facets; and
    communicating, via the computing device, said set of search suggestions to a device of said user.

2. The method of claim 1, further comprising:
    combining said terms in said set of terms with said facets in said set of facets to create search suggestions of the set.

3. The method of claim 1, further comprising:
    organizing said set of search suggestions such that individual subsets of said search suggestions making up the entire set of search suggestions are associated with an individual facet of said facet set.

4. The method of claim 1, said communication causing display of said search suggestions such that a user interface (UI) of the inbox is modified to display the search suggestions.

5. The method of claim 1, wherein said attributes of each message include data selected from a group consisting of: an identity of a sender or recipient of a message, message content in a message, a time of a message, where it was sent from, where it was received, whether there was an attachment and what type of attachment it is, what rules, if any, the message is subject to and user activity on the message.

6. The method of claim 1, wherein a threshold for determining the set of search suggestions dictates how many characters in a character string can trigger said determination of said set of search suggestions.

7. The method of claim 6, further comprising:
    analyzing said search query as it entered; and
    determining that said threshold is satisfied by a number of characters in said character string, wherein said searching is triggered based on said determination.

8. The method of claim 1, wherein said search suggestions comprise at least a mixture of contact information, search completions and messages derived from said inbox.

9. A non-transitory computer-readable storage medium tangibly encoded with computer-executable instructions, that when executed by a computing device, perform a method comprising:
    receiving, at the computing device, a search query for a search of an inbox of a user, said search query comprising a character string;
    searching, via the computing device, a collection of messages within the inbox based on the search query and identifying a first set of messages comprising information that includes said character string;
    parsing, via the computing device, the first set of messages and, based on said parsing, identifying attributes of each message and a type of each attribute;
    generating, via the computing device, a set of facets based on the identified attributes, each generated facet comprising a data item that represents at least one of a type of attribute;
    analyzing, via the computing device, information associated with messages in the inbox based on the search query and said set of facets, and based on said analysis, determining a set of terms that are associated with each facet in the set of facets;
    determining, via the computing device, a set of search suggestions based on the set of terms and the set of facets; and
    communicating, via the computing device, said set of search suggestions to a device of said user.

10. The non-transitory computer-readable storage medium of claim 9, further comprising:
    combining said terms in said set of terms with said facets in said set of facets to create search suggestions of the set.

11. The non-transitory computer-readable storage medium of claim 9, further comprising:
    organizing said set of search suggestions such that individual subsets of said search suggestions making up the entire set of search suggestions are associated with an individual facet of said facet set.

12. The non-transitory computer-readable storage medium of claim 9, said communication causing display of said search suggestions such that a user interface (UI) of the inbox is modified to display the search suggestions.

13. The non-transitory computer-readable storage medium of claim 9, wherein said attributes of each message include data selected from a group consisting of: an identity of a sender or recipient of a message, message content in a message, a time of a message, where it was sent from, where it was received, whether there was an attachment and what type of attachment it is, what rules, if any, the message is subject to and user activity on the message.

14. The non-transitory computer-readable storage medium of claim 9, wherein a threshold for determining the set of search suggestions dictates how many characters in a character string can trigger said determination of said set of search suggestions.

15. The non-transitory computer-readable storage medium of claim 14, further comprising:
  analyzing said search query as it entered; and
  determining that said threshold is satisfied by a number of characters in said character string, wherein said searching is triggered based on said determination.

16. The non-transitory computer-readable storage medium of claim 9, wherein said search suggestions comprise at least a mixture of contact information, search completions and messages derived from said inbox.

17. A computing device comprising:
  a processor; and
  a non-transitory computer-readable storage medium for tangibly storing thereon program logic for execution by the processor, the program logic comprising:
    logic executed by the processor for receiving, at a computing device, a search query for a search of an inbox of a user, said search query comprising a character string;
    logic executed by the processor for searching, via the computing device, a collection of messages within the inbox based on the search query and identifying a first set of messages comprising information that includes said character string;
    logic executed by the processor for parsing, via the computing device, the first set of messages and, based on said parsing, identifying attributes of each message and a type of each attribute;
    logic executed by the processor for generating, via the computing device, a set of facets based on the identified attributes, each generated facet comprising a data item that represents at least one of a type of attribute;
    logic executed by the processor for analyzing, via the computing device, information associated with messages in the inbox based on the search query and said set of facets, and based on said analysis, determining a set of terms that are associated with each facet in the set of facets;
    logic executed by the processor for determining, via the computing device, a set of search suggestions based on the set of terms and the set of facets; and
    logic executed by the processor for communicating, via the computing device, said set of search suggestions to a device of said user.

18. The computing device of claim 17, further comprising:
  logic executed by the processor for combining said terms in said set of terms with said facets in said set of facets to create search suggestions of the set.

19. The computing device of claim 17, further comprising:
  logic executed by the processor for organizing said set of search suggestions such that individual subsets of said search suggestions making up the entire set of search suggestions are associated with an individual facet of said facet set.

20. The computing device of claim 17
  logic executed by the processor for analyzing said search query as it entered;
  logic executed by the processor for determining that a threshold for determining the set of search suggestions is satisfied by a number of characters in said character string, wherein said searching is triggered based on said determination, wherein said threshold dictates how many characters in a character string can trigger said determination of said set of search suggestions.

* * * * *